United States Patent
Williams

Patent Number: 5,924,947
Date of Patent: Jul. 20, 1999

[54] ASYMMETRICALLY HYDRAULICALLY DAMPED DRIVEBELT TENSIONER FOR AUTOMOTIVE ENGINE

[75] Inventor: Bruce P. Williams, Grosse Pointe Park, Mich.

[73] Assignee: Ford Global Technologies, Inc., Dearborn, Mich.

[21] Appl. No.: 08/899,091

[22] Filed: Jul. 23, 1997

[51] Int. Cl.⁶ ...................................................... F16H 7/12
[52] U.S. Cl. ............................................ 474/133; 474/148
[58] Field of Search ..................................... 474/101, 109, 474/110, 111, 113, 114, 115, 117, 133, 135, 148

[56] References Cited

U.S. PATENT DOCUMENTS

| | | | |
|---|---|---|---|
| 4,822,322 | 4/1989 | Martin | 474/135 |
| 4,923,435 | 5/1990 | Kadota et al. | 474/135 |
| 4,969,858 | 11/1990 | Hertrich et al. | 474/135 |
| 5,045,029 | 9/1991 | Dec et al. | 474/135 |
| 5,073,148 | 12/1991 | Dec | 474/135 |
| 5,176,581 | 1/1993 | Kumm | 474/110 |
| 5,328,415 | 7/1994 | Furutani et al. | 474/135 |
| 5,482,126 | 1/1996 | Bouit et al. | 474/110 |
| 5,591,094 | 1/1997 | Farmer et al. | 474/117 |
| 5,632,697 | 5/1997 | Serkh | 474/109 |
| 5,713,808 | 2/1998 | Ohta | 474/135 |

FOREIGN PATENT DOCUMENTS

| | | |
|---|---|---|
| 450620 | 10/1991 | European Pat. Off. . |
| 272549 | 9/1992 | Japan . |
| 159458 | 6/1994 | Japan . |
| 2090936 | 7/1982 | United Kingdom . |

*Primary Examiner*—John A. Jeffery
*Assistant Examiner*—Matthew A. Kaness
*Attorney, Agent, or Firm*—Jerome R. Drouillard

[57] ABSTRACT

An accessory belt tensioner for an automotive engine includes a hub adapted to be fixed to an engine, an arm journaled upon the hub, a tensioner pulley mounted upon the arm, a torsion spring interposed between the arm and hub, with the spring serving to resiliently bias the arm and tensioner pulley into contact with an accessory drivebelt, and a rotational fluid damper, incorporated within the hub, for damping the rotational motion of the arm with respect to the hub.

11 Claims, 2 Drawing Sheets

5,924,947

ASYMMETRICALLY HYDRAULICALLY DAMPED DRIVEBELT TENSIONER FOR AUTOMOTIVE ENGINE

BACKGROUND OF THE INVENTION

1. Technical Field

The present invention relates to a device for selectively eliminating resilience incorporated within a front end accessory drive belt tensioning system for an automotive engine.

2. Background Information

Front end accessory drives incorporated in modern automotive engines are called upon to power a number of accessories such as an air conditioning compressor, alternator, power steering pump, water pump, air injection pump, and other devices. Problems have arisen with front end accessory drives because certain accessories, such as engine cooling fans or alternators, have considerable rotational inertia. This may cause objectionable belt noise during certain operating modes of the engine. For example, during the one-two upshift of an automatic transmission, the engine will decelerate at an exceedingly rapid rate. As a result, the inertia of the alternator may cause the alternator to actually become a driving portion of the system instead of the engine's crankshaft during the wide-open throttle upshift. This overdrive condition caused by inertia of the alternator or engine driven cooling fan, may cause a slack portion or "bubble" to develop in the accessory drive belt, thereby causing a squeal. Unfortunately, motorists may incorrectly identify the squeal with defective parts and as a result seek expensive, albeit unneeded, warranty repairs.

In particularly severe cases, the bubble phenomenon may result in the belt jumping off one of more of the pulleys, and this may lead to a very expensive repair, without remedying anything. A tensioner according to the present invention avoids the problem of undesirable slack developing in a drive belt with a simple mechanical device divorced from the engine control system.

SUMMARY OF THE INVENTION

An accessory belt tensioner for an automotive engine includes a hub adapted to be fixed to an engine, an arm journaled upon the hub, a tensioner pulley mounted upon the arm, and a torsion spring interposed between the arm and the hub, with the torsion spring serving to resiliently bias the arm and tensioner pulley into contact with an accessory drivebelt.

An accessory belt tensioner according to the present invention further includes the rotational fluid damper incorporated within the hub, for damping the rotational motion of the arm with respect to the hub with the rotational damper including an annular fluid chamber formed integrally with the hub, a piston mounted for rotation within the annular fluid chamber and fixed to rotate with the arm, a damping fluid filling a substantial portion of the volume of the fluid chamber such that rotation of the arm causing rotation of the piston further causes concomitant flow of the damping fluid within the annular fluid chamber, and a damping valve mounted within the fluid chamber with the valve allowing a relatively lower volumetric rate of flow of damping fluid, thereby providing a greater level of damping, when the arm is moving in a direction such that belt slack is increased, and a relatively higher volumetric of flow, thereby providing a lesser level of damping, when the arm is moving in a direction such that belt slack is decreased.

The damping valve, according to the present invention, may comprise a check valve mounted within the annular fluid chamber and having a semiclosed position in which fluid compressed by the piston is allowed to flow through a relatively restricted orifice at a lower volumetric rate, with the check valve further having an open position in which fluid compressed by the piston is allowed to flow through a substantially unrestricted orifice at a higher volumetric rate.

The check valve includes a valve seat which divides the fluid into a compression volume and an expansion volume. In general, the check valve comprises a spherical valve element which is urged on a valve seat by means of a spring, with the valve element and spring being caged between an orifice plate positioned radially within the annular fluid chamber and a spring retainer positioned radially within the annular fluid chamber.

Other objects, features, and advantages of the present invention will become apparent to the reader of the present specification.

DETAILED DESCRIPTION OF PREFERRED EMBODIMENTS

Figure 1:
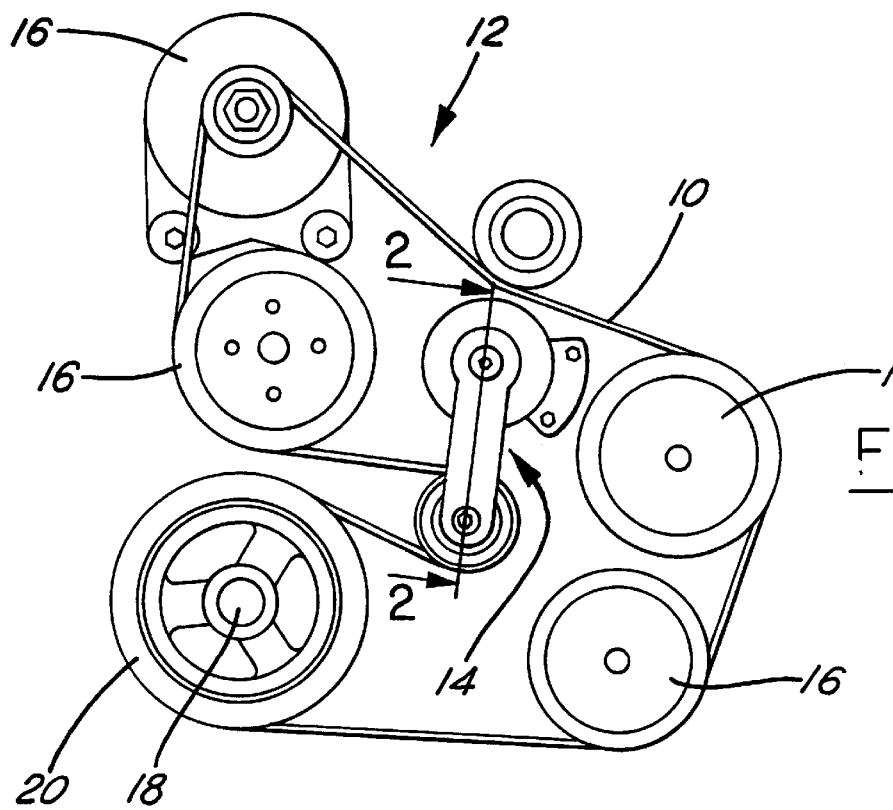
FIG. 1 is a schematic representation of an engine having a tensioner according to the present invention.

As shown in FIG. 1, automotive engine 12 having a plurality of rotating accessories 16 has drive belt 10 which is powered by engine crankshaft 18 by means of crankshaft pulley 20. Tension is maintained on drive belt 10 by means of tensioner 14 which is attached by bolts or other suitable means to engine 12.

Figure 3:
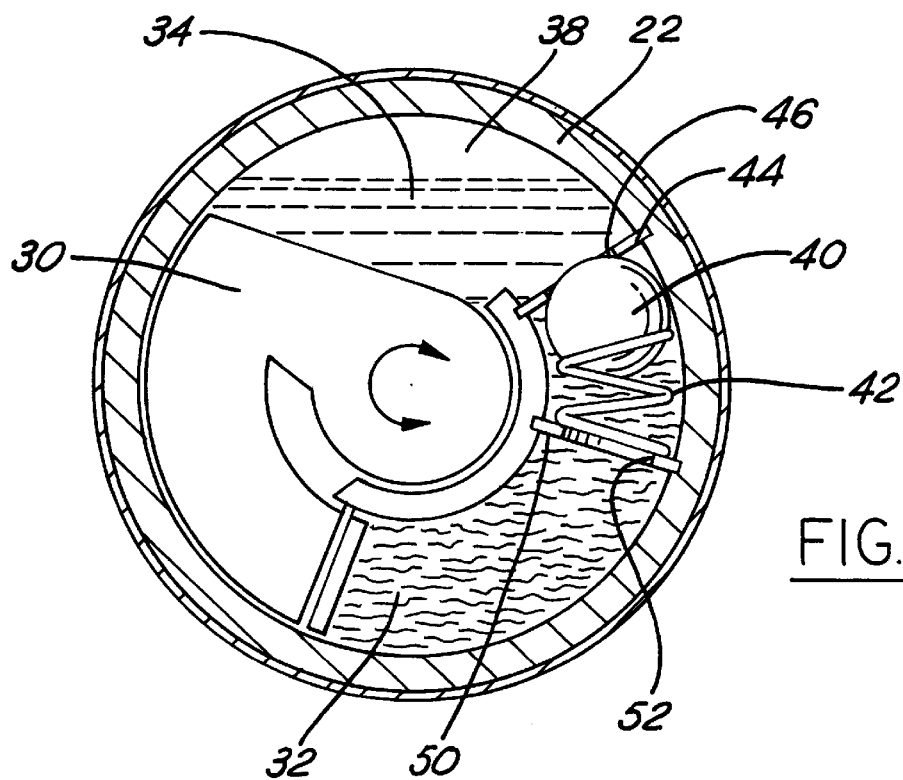
FIG. 3 is a plan view of a portion of a tensioner according to the present invention, taken along the line 3—3 of FIG. 2.
Figure 2:
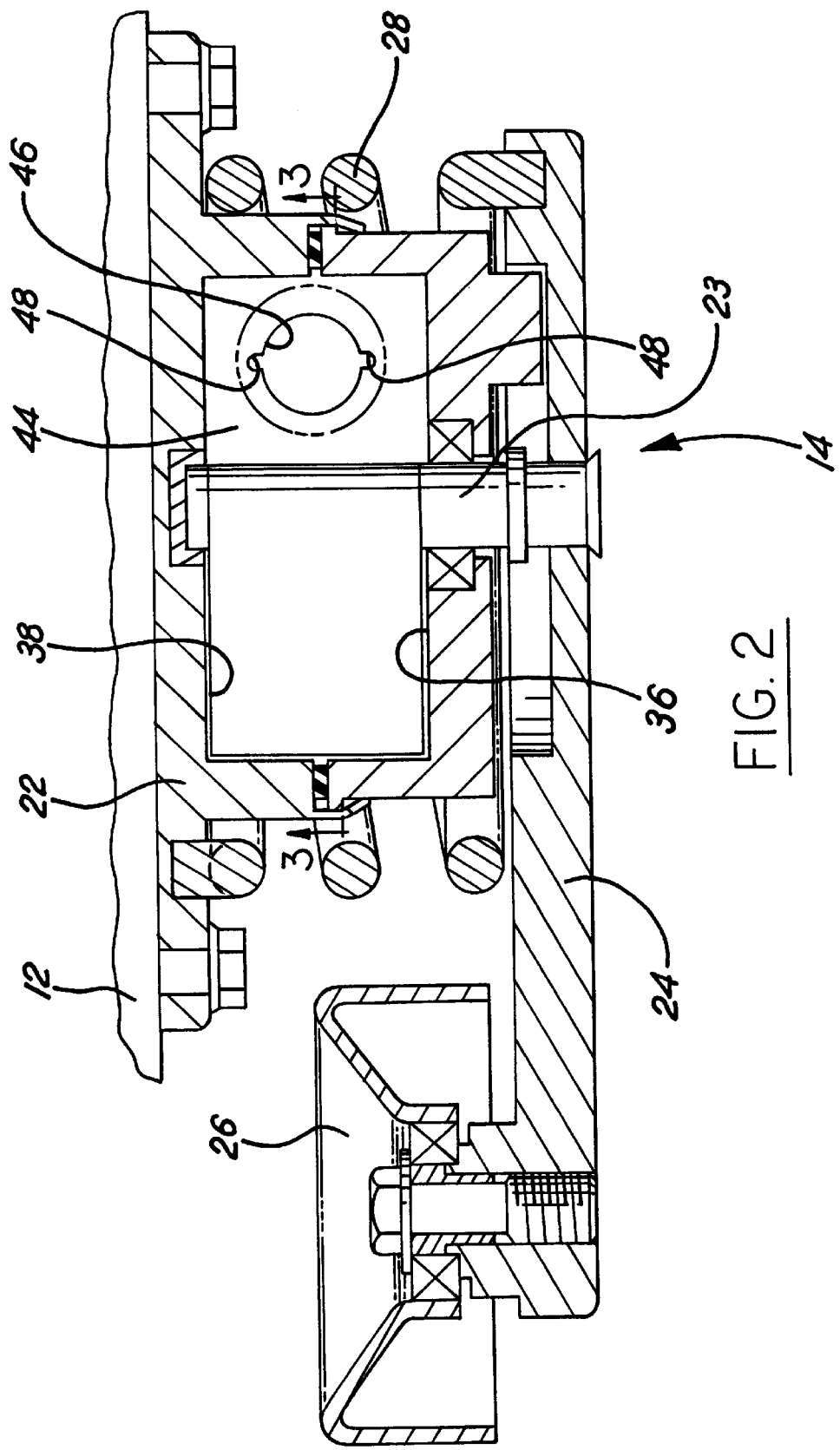
FIG. 2 is a sectional view, partially broken away, of a tensioner according to the present invention, taken along the line 2—2 of FIG. 1.

Details of the construction of tensioner 14 are shown with particularity in FIGS. 2 and 3. Hub 22 is attached to the front of engine 12. Spindle 23, which is rotatably supported by hub 22, has arm 24 journaled thereto. It is seen from FIG. 1 that arm 24, being rotatably attached to hub 22, is free to rotate tensioner pulley 26 in a direction so as to maintain tension on drive belt 10. Torsion spring 28 is interposed between arm 24 and hub 22 for the purpose of maintaining tension upon drive belt 10. Pulley 26, which is rotatably mounted upon arm 24, contacts drivebelt 10 in response to the urging of torsion spring 28. Unfortunately, torsion spring 28 cannot be made with a sufficient rate to both resiliently tension belt 10 and prevent a bubble or slack length from developing in the belt during periods of extreme engine deceleration.

Piston 30, which is nonrotatably mounted upon spindle 23, rotates in unison with arm 24. FIG. 3 illustrates details of piston 30 and its accompanying valving. Because piston 30 occupies approximately 25% of the volume of the generally annular fluid chamber 32 which is almost completely filled with hydraulic damping fluid 34, piston 30 is able to smoothly slide along the end faces 36 and 38 of fluid chamber 32.

As arm 24 and piston 30 rotate in unison in response to inputs from drivebelt 10, fluid 34 is caused to flow past a damping valve located within fluid chamber 32. This valve has four components. Spherical valve element 40 is biased by compression spring 42 into contact with first valve plate 44 which is positioned radially within annular fluid chamber 32 and which has a control orifice comprising generally circular valve seat 46 and cutouts 48.

When tensioner arm 24 and pulley 26 are being urged in a direction in which slack in belt 10 is increasing, spherical valve element 40 will be pushed onto valve seat 46 by the combined forces of compression spring 42 and the force imposed upon element 40 by hydraulic fluid 34. A relatively lower volumetric flow of fluid will be established through cutouts 48, so that tensioner arm 24 will not be hydrostatically locked. Conversely, when arm 24 and pulley are being urged in a direction in which slack in belt 10 is decreasing, the flow of hydraulic fluid 34, as excited by piston 30, will be in direction tending to push spherical element 40 away from valve seat 46.

Once spherical element 40 has come unseated from valve seat 46, flow through annular fluid chamber 32 past valve element 40 will be controlled primarily by the size of orifice 52, which is formed in second valve plate 50, which is positioned radially in fluid chamber 32, and which further serves as a retainer for compression spring 42. Of course, once the velocity of piston 30 has decreased past a threshold which is determined by at least the spring constant of spring 42 and the diameter of spherical element 40, spring 42 will once again place spherical element 42 in contact with valve seat 46.

While the invention has been shown and described in its preferred embodiments, it will be clear to those skilled in the arts to which it pertains that many changes and modifications may be made thereto without departing from the scope of the invention.

I claim:

1. An accessory belt and belt tensioner for an automotive engine, comprising:
    a hub adapted to be fixed to an engine;
    an arm journaled upon the hub;
    a tensioner pulley mounted upon the arm;
    a torsion spring interposed between said arm and said hub, with said spring serving to resiliently bias the arm and tensioner pulley into contact with an accessory drive belt; and
    a rotational fluid damper, incorporated within said hub, for damping the rotational motion of the arm with respect to the hub, with said rotational fluid damper comprising:
        an annular fluid chamber formed integrally with the hub;
        a piston mounted for rotation within the annular fluid chamber and fixed to rotate with the arm;
        a damping fluid filling a substantial portion of the volume of said fluid chamber which is unoccupied by the piston such that rotation of the arm causing rotation of the piston further causes concomitant flow of the damping fluid within the annular fluid chamber; and
        a damping valve mounted within the fluid chamber, with said valve allowing a relatively lower volumetric rate of flow of damping fluid, thereby providing a greater level of damping, when the arm is moving in a direction such that belt slack is increased, and a relatively higher volumetric rate of flow, thereby providing a lesser level of damping, when the arm is moving in a direction such that belt slack is decreased.

2. An accessory belt tensioner according to claim 1, wherein said damping valve comprises a check valve mounted within said annular fluid chamber and having a semi-closed position in which fluid compressed by the piston is allowed to flow through a relatively restricted orifice at said lower volumetric rate, with said check valve further having an open position in which fluid compressed by the piston is allowed to flow through a substantially unrestricted orifice at said higher volumetric rate.

3. An accessory belt tensioner according to claim 2, wherein said check valve comprises a spring-loaded, spherical valve element and a generally circular valve seat with at least one cutout formed therein so as to permit fluid to flow past said valve element when the valve element is in contact with the seat.

4. An accessory belt tensioner according to claim 3, wherein said valve seat is mounted within said annular fluid chamber such that the valve seat divides the fluid into a compression volume and an expansion volume.

5. An accessory belt tensioner according to claim 4, wherein said valve seat is formed within a valve plate positioned radially within said annular fluid chamber.

6. An accessory belt tensioner according to claim 3, wherein said check valve and spring are caged between an orifice plate positioned radially within said annular fluid chamber and having said valve seat formed therein and a spring retainer positioned radially within the annular fluid chamber.

7. An accessory belt tensioner according to claim 6 wherein said spring retainer serves as a flow restrictor during higher volumetric flow rates.

8. An accessory belt tensioner according to claim 1, wherein said piston occupies about one-quarter of the space defined by said annular fluid chamber.

9. An accessory belt and belt tensioner for an automotive engine, comprising:
    a hub adapted to be fixed to an engine;
    an arm journaled upon the hub;
    a tensioner pulley mounted upon the arm;
    a torsion spring interposed between said arm and said hub, with said spring serving to resiliently bias the arm and tensioner pulley into contact with an accessory drive belt; and
    a rotational fluid damper, incorporated within said hub, for damping the rotational motion of the arm with respect to the hub, with said rotational damper comprising:
        an annular fluid chamber formed integrally with the hub;
        a piston mounted for rotation within the annular fluid chamber and fixed to rotate with the arm;
        a damping fluid filling a substantial portion of the volume of said fluid chamber which is unoccupied by the piston such that rotation of the arm causing rotation of the piston further causes concomitant flow of the damping fluid within the annular fluid chamber; and
        an asymmetrical damping valve mounted within the fluid chamber, with said valve comprising at least two valve plates mounted radially within the annular fluid chamber, with said valve plates each having at least one control orifice, such that fluid displaced by the piston in response to rotation of the arm passes through each of said orifices.

10. An accessory belt tensioner according to claim 9, wherein said damping valve further comprises a spherical valve element mounted within said annular fluid chamber between said valve plates, with said spherical valve element being urged into contact with a valve seat formed in a first of said valve plates by a resilient element, with said spherical valve element having a semiclosed position in which fluid compressed when the piston is moving in a first direction is allowed to flow through a relatively restricted orifice defined by the intersection of the spherical valve element with the valve seat at a lower volumetric rate, with said valve element further having an open position in which fluid compressed when the piston is moving in a second direction is allowed to flow through a substantially unrestricted orifice formed in a second of said valve plates, at a higher volumetric rate.

11. An accessory belt tensioner according to claim 10, wherein said check valve seat comprises circular seat having a cutout formed therein so as to permit fluid to flow past said valve element when the valve element is in contact with the seat.

\* \* \* \* \*